United States Patent
Wheelock (10) Patent No.: US 11,743,197 B2
(45) Date of Patent: Aug. 29, 2023

(54) SYSTEM TO ENABLE END TO END QOS-LOW LATENCY-PRIORITIZATION FOR NAT ENABLED NETWORKS

(71) Applicant: ARRIS Enterprises LLC, Suwanee, GA (US)

(72) Inventor: Ian G. Wheelock, Cork (IE)

(73) Assignee: ARRIS ENTERPRISES LLC, Suwanee, GA (US)

(*) Notice: Subject to any disclaimer, the term of this patent is extended or adjusted under 35 U.S.C. 154(b) by 98 days.

(21) Appl. No.: 17/150,132

(22) Filed: Jan. 15, 2021

(65) Prior Publication Data
US 2021/0243131 A1    Aug. 5, 2021

Related U.S. Application Data

(60) Provisional application No. 62/967,855, filed on Jan. 30, 2020.

(51) Int. Cl.
*H04L 47/2441* (2022.01)
*H04L 47/10* (2022.01)
(Continued)

(52) U.S. Cl.
CPC .......... *H04L 47/2441* (2013.01); *H04L 47/13* (2013.01); *H04L 61/256* (2013.01); *H04L 61/5038* (2022.05)

(58) Field of Classification Search
CPC ... H04L 47/2441; H04L 47/13; H04L 61/256; H04L 61/5038; H04L 47/805;
(Continued)

(56) References Cited

U.S. PATENT DOCUMENTS

| 2005/0018651 A1 | 1/2005 | Yan et al. |
| 2007/0058567 A1* | 3/2007 | Harrington ......... H04L 12/2898 370/254 |

(Continued)

FOREIGN PATENT DOCUMENTS

| CN | 101771733 | 7/2010 |
| CN | 104486589 A * | 4/2015 |

OTHER PUBLICATIONS

International Search Report and the Written Opinion of the International Searching Authority dated May 10, 2021 in International (PCT) Application No. PCT/US2021/013601.
(Continued)

*Primary Examiner* — Yaotang Wang
(74) *Attorney, Agent, or Firm* — Wenderoth, Lind & Ponack, L.L.P.

(57) ABSTRACT

A network and method for connecting devices on a Local Area Network ("LAN") to the Internet via a Network Address Translation ("NAT") enabled gateway and server. The gateway includes an Internet address for enabling the gateway to be addressed by the server and the LAN. A plurality of ports on the gateway enables the gateway to receive and transmit data to and from the server and the LAN. A processor divides the ports on the gateway into at least a first range and a second range of port numbers. Classified traffic identified as suitable for a higher level of QoS is assigned to the first range of port numbers, and classified traffic identified as suitable for a lower level of QoS is assigned to the second range. The gateway provides devices on the LAN with a level of QoS depending upon the port numbers to which they are assigned.

20 Claims, 5 Drawing Sheets

(51) Int. Cl.
*H04L 61/256* (2022.01)
*H04L 61/5038* (2022.01)

(58) Field of Classification Search
CPC . H04L 61/2514; H04L 61/2517; H04L 47/24; H04L 61/2557; H04L 49/351; H04L 49/205
See application file for complete search history.

(56) References Cited

U.S. PATENT DOCUMENTS

| | | | |
|---|---|---|---|
| 2011/0310863 A1* | 12/2011 | Shieh | H04L 61/2517 370/338 |
| 2012/0269059 A1 | 10/2012 | Gupta et al. | |
| 2013/0173797 A1* | 7/2013 | Poirer | H04L 61/2015 709/225 |
| 2013/0223230 A1* | 8/2013 | Swaminathan | H04W 76/10 370/241 |
| 2018/0262359 A1 | 9/2018 | Wu | |
| 2020/0382387 A1* | 12/2020 | Pasupathy | H04L 47/2425 |

OTHER PUBLICATIONS

International Preliminary Report on Patentability dated Jul. 28, 2022 in International (PCT) Application No. PCT/US2021/013601.

\* cited by examiner

SYSTEM TO ENABLE END TO END QOS-LOW LATENCY-PRIORITIZATION FOR NAT ENABLED NETWORKS

FIELD

The present disclosure relates generally to a method and a network gateway device having Network Addressing Translation ("NAT") capabilities, and more particularly to a network gateway device which provides end-to-end Quality of Service ("QoS") low latency prioritization.

BACKGROUND

Cable service providers, which are also referred to as Multiple System Operators ("MSO"), typically transmit analog and digital video broadcast television signals, as well as broadband data services, to their customers. These broadband data services typically include Internet access using the Data Over Cable Service Interface Specification ("DOCSIS") protocol. To provide television and data Services, a MSO typically uses a Cable Modem Termination System ("CMTS") for the data services and a quadrature amplitude modulation ("QAM") multiplexer for downstream broadcast television, narrow cast and video on demand ("VoD") traffic signals. These devices may be located at one or more hubs, which are typically connected to the head end via a network according to a networking protocol, such as, for example, Ethernet or SONET, as known in the art. These devices typically have multiple outputs for downstream signals, as well as multiple inputs for upstream signals, that are sent to or received at consumer households, bars, and other commercial establishments.

Currently NAT is used to cope with Internet Protocol Version Four ("IPv4") address exhaustion as well as minimizing the number of exposed IP ("Internet Protocol") addresses that may be present within a network. In the case of Internet Service Providers ("ISPs"), broadband gateways assign local IP addresses from a pre-configured IP subnet for local devices. The assigned IP addresses are different to the external Wide Area Network ("WAN") IP address the ISP uses for the broadband gateway itself, which is typically provided using the ISP Dynamic Host Configuration Protocol ("DHCP") system. Traffic from local devices going to the internet are transformed using Network Address Port Translation ("NAPT" or "NAT" for short), whereby their assigned IP addresses are replaced by the gateway WAN IP address, and the source Transmission Control Protocol ("TCP") or User Datagram Protocol ("UDP") port numbers are replaced with available allocations from the NAT function. For a Source ("SRC"), the NAT function retains this SRC_IP+SRC_port to WAN_IP+NEW SRC_port mapping, and when the broadband gateway receives traffic sent to WAN_IP+NEW SRC_port, it is able to replace it with the recorded NAT mapping, and relays the traffic to the local device.

The use of NAT typically means that the IP address of local devices are "obfuscated," and are extremely difficult to resolve without the NAT mapping information. As a result, when Broadband Network Gateways ("BNG") or DOCSIS CMTS devices that connect broadband gateways to the Internet, all they see are the so-called WAN IP addresses of the gateways—effectively only being able to provide QoS to the gateway itself, and not the individual devices behind it.

There are ways of dynamically signaling the BNG/CMTS function, but given the ephemeral nature of TCP and UDP traffic flows, constantly updating the BNG/CMTS with new 5-tuple information for a flow is not scalable. Accordingly, there is a need for way to enable a simpler configuration of the BNG/CMTS QoS and classification system in order to allocate QoS to IP devices behind the broadband gateway in a scalable way.

SUMMARY

As described herein is a network and method for connecting devices on a Local Area Network ("LAN") to the Internet via a Network Address Translation ("NAT") enabled gateway and a server. The gateway includes an Internet address for enabling the gateway to be addressed by the server and the LAN. A plurality of ports on the gateway enables the gateway to receive and transmit data to and from the server and the LAN. A processor divides the ports on the gateway into at least a first range of port numbers and a second range of port numbers. Classified traffic identified as suitable for a higher level of QoS is assigned to the first range of port numbers, and classified traffic identified as suitable for a lower level of QoS is assigned to the second range of port numbers. The gateway provides devices on the LAN with a level of QoS depending upon the port numbers to which they are assigned. The ports on the gateway may be divided into a third range of port numbers to provide an additional level of QoS. It should be noted that the number N of ranges of port numbers is not limited to two or three, but can be nearly any number N which is substantially greater than two (e.g., dozens or even hundreds).

The improved NAT process described herein provides a NAT enabled network the ability to identify devices or traffic flows from devices within the home network that need special QoS treatment, such as low-latency, or high bandwidth. The NAT enabled network splits or defines ranges of TCP and UDP ports associated a WAN_IP address which can be used for local high priority purposes. The improved NAT process is also able to ensure that a local broadband gateway, in combination with a BNG/CMTS can deliver this enhanced QoS without requiring significant non-stop QoS signaling across the broadband network.

DETAILED DESCRIPTION OF THE EXEMPLARY EMBODIMENTS AND METHODS

Figure 1:
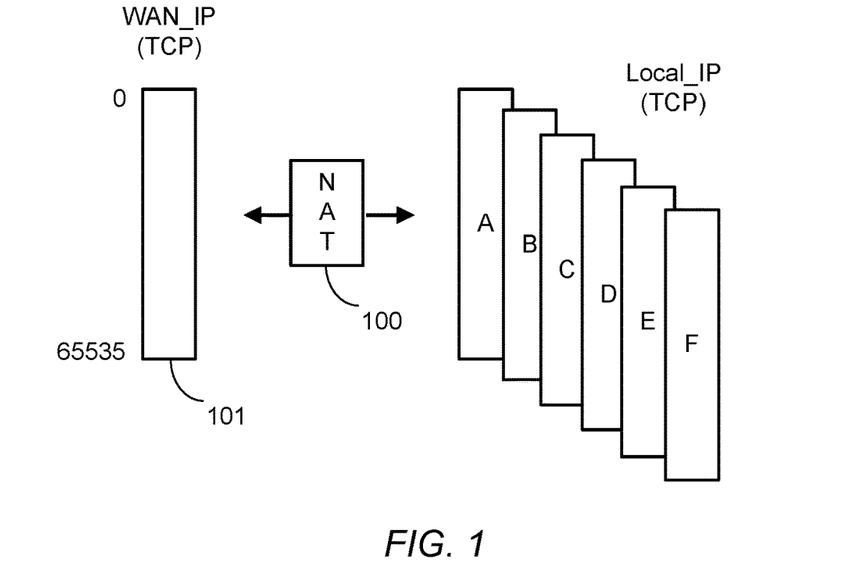
FIG. 1 is an illustration of a normal NAT process for translating the network addresses of a plurality of home network devices A, B, C, D, E, and F having Local_IP addresses, and also illustrated is a WAN_IP address and its associated port numbers.

Referring now to FIG. 1, the figure illustrates a normal NAT process 100 for a plurality of devices A, B, C, D, E, and F having Local_IP addresses and a WAN_IP address and its associated port numbers 101. The WAN_IP address is typically associated with port numbers that range from 0 through 65535. The plurality of local devices A, B, C, D, E, and F are each assigned a local_IP address. The WAN_IP address and port numbers 101, as well as the Local_IP addresses for the devices A, B, C, D, E, and F are preferably configured to comply with TCP. Basically, within a home network, NAT works on the basis of mapping all TCP and UDP traffic from local devices, such as A, B, C, D, E, and F to allocated TCP and UDP port numbers attached to the WAN_IP address 101. The allocation of such ports is arbitrary.

Figure 2:
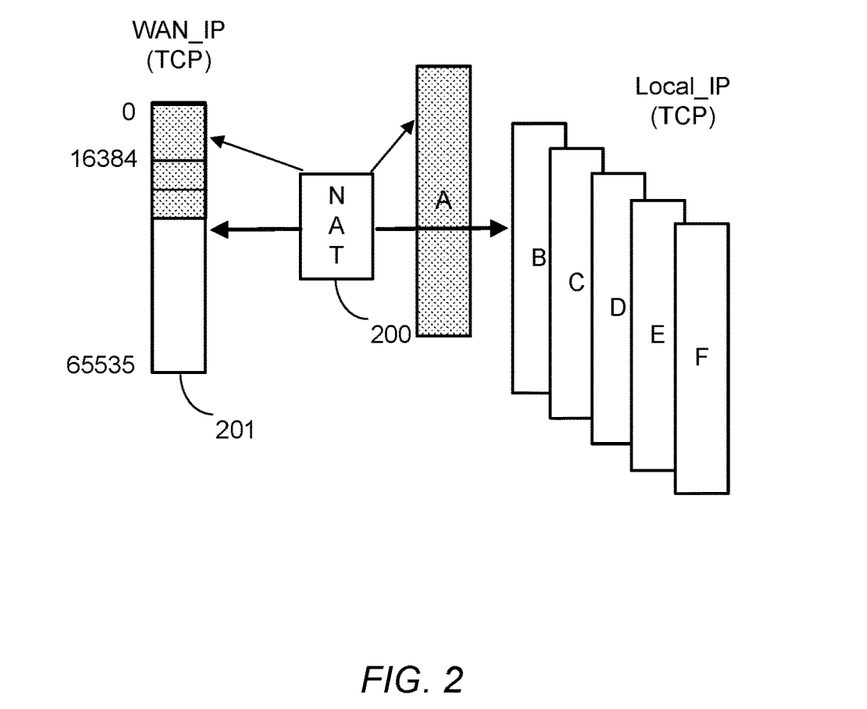
FIG. 2 is an illustration of an improved NAT process for translating the network addresses of a plurality of home network devices A, B, C, D, E, and F having Local_IP addresses, and also illustrated is a WAN_IP address and its associated port numbers.

Referring now to FIG. 2, the figure illustrates an improved NAT process 200 that includes a plurality of devices A, B, C, D, E, and F having Local_IP addresses and a WAN_IP address and its associated port numbers 201. The improved NAT process 200 changes the arbitrary allocation of the normal NAT process 100 so that defined ranges of TCP and UDP ports associated with the WAN_IP address 201 can be used for local high priority purposes, and these defined ranges notified to a BNG/CMTS. From a BNG/CMTS perspective the TCP/UDP port space is partitioned into ranges that can in turn be mapped to explicit QoS allocations. In FIG. 2, the port space is preferably partitioned into at least a first range of 0 to 16,384 and a second range of 16,385 to 65,535. If desired, the second range can be further partitioned.

Figure 3:
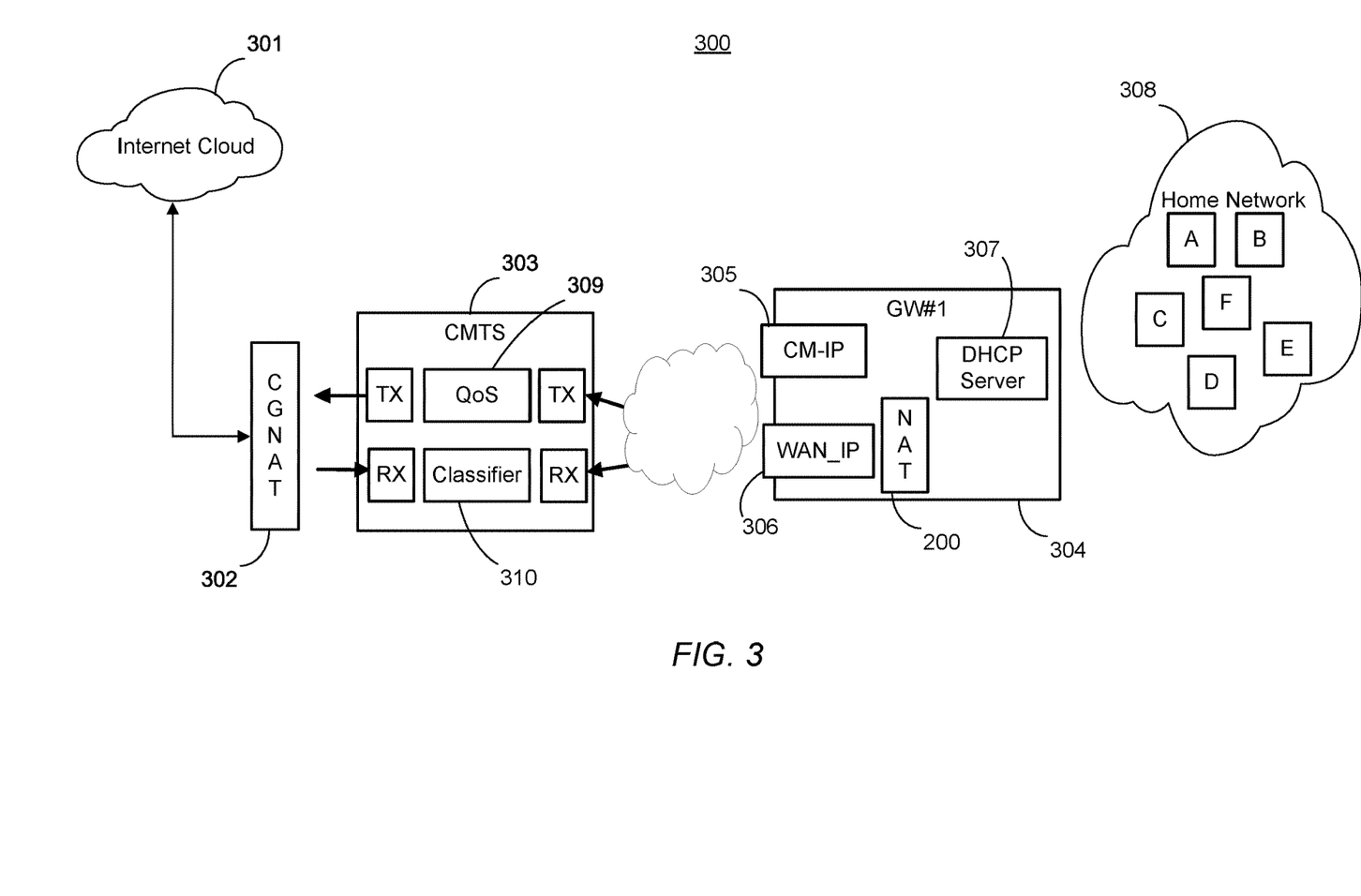
FIG. 3 is an illustration of a network that utilizes the improved NAT process of FIG. 2.

Referring now to FIG. 3, the figure illustrates a network 300 that utilizes the improved NAT process 200 of FIG. 2. The network 300 is connected to the Internet Cloud 301 via a Commercial Grade Network Address Translation ("CG-NAT") device 302 which transmits and receives data to and from a Cable Modem Termination System ("CMTS") 303. A QoS engine 309 and a classifier 310 are included within the CMTS 303 which transmits and receives data to and from a gateway 304. The gateway 304 includes a cable modem_IP address 305, a WAN_IP address 306, the improved NAT process 200 of FIG. 2, and a DHCP server 307. In FIG. 3, the DHCP server 307 is able to communicate with a home network 308 which includes devices A, B, C, D, E, and F having local_IP addresses; A=10.0.0.11, B=10.0.0.12, C=10.0.0.13, D=10.0.0.14, E=10.0.0.15, and F=10.0.0.17, for example.

It should be noted that the CMTS 303 has information about WAN_IP address 306 and the CM_IP address 305 of the gateway 304, and has no information about the home network 308. It should be further noted that the QoS engine 309 and classifier 310 include information relating to the Media Access Control ("MAC") address of the gateway 304; a primary quality of service, such as Pri_SF=1 Mbps; a secondary quality of service, such as Sec_SF=40 Mbps; and can classify the WAN_IP address 306 of the gateway 304. To expose the QoS of the devices in home network 308 to the CMTS 303, classifiers are added to the Sec_SF information, based on the TCP/UDP port range 0-16 k. In order to provide extra service to the home network 308, it may also be desirable to split the NAT TCP/UDP port space using the range 0-16 k for specific addresses in the home network 308, and using the range 16 k to 64 k for all other IP addresses.

The assignment of traffic in the local home network 308 to the NAT TCP/UDP port ranges can be based on multiple traffic classifiers if required. For instance, a simple option is to assign an explicit IP address to use the reserved TCP/UDP port range, thus ensuring that all traffic for a specific device in the home network would get differentiated QoS. Another approach could be to use specific DSCP markings in packets to use the reserved TCP/UDP port range. Multiple TCP/UDP port ranges could also be identified to enable multiple QoS levels to be supported by the BNG/CMTS 303. In terms of being able to classify traffic to identify if a device or a protocol requires higher QoS, then this is preferably achieved through a user interface that is exposed to a user to pick out priorities for different devices/services/etc. Alternatively, it could be offered through service provider policies, e.g., ensuring World of Warcraft games get high QoS.

Figure 4:
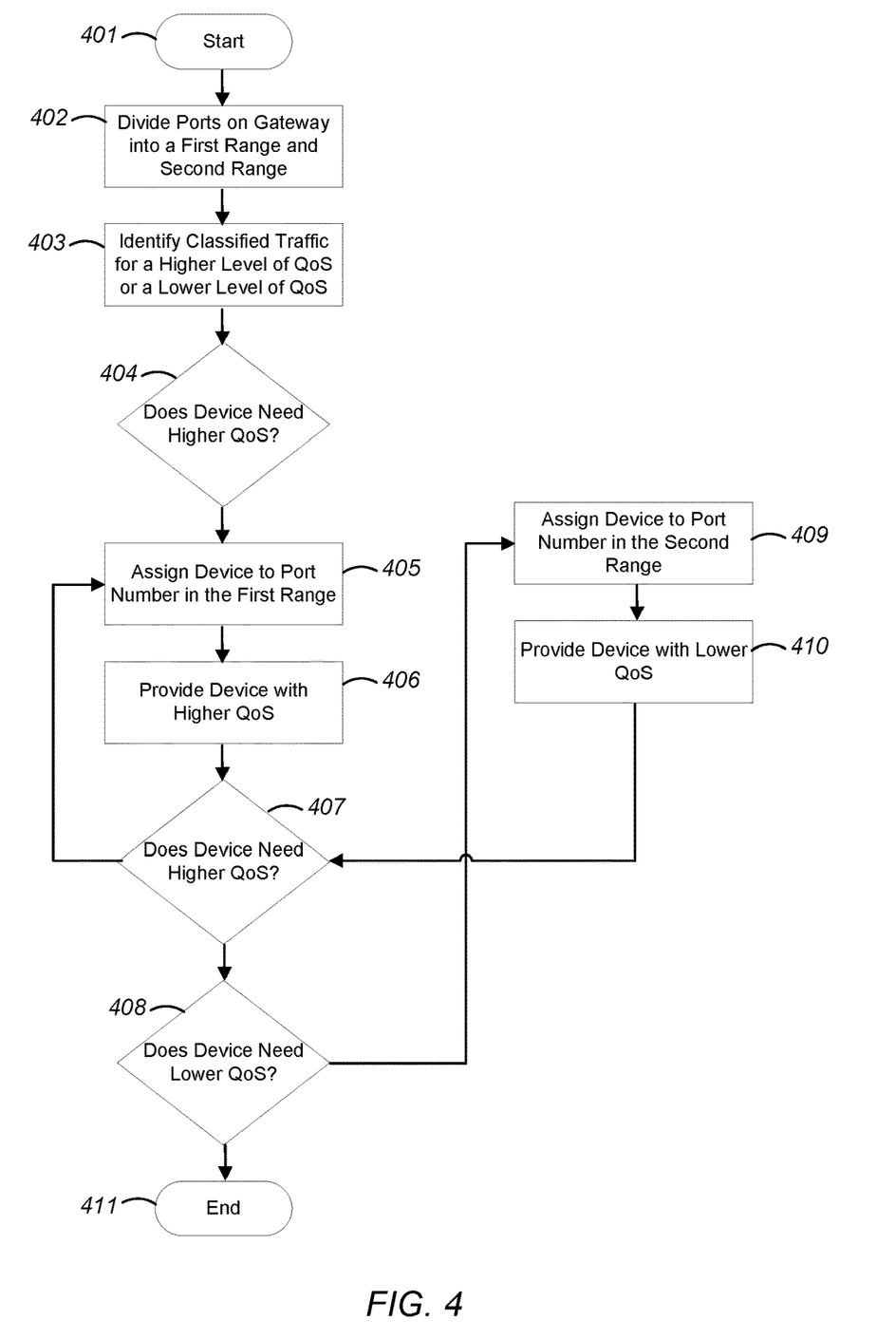
FIG. 4 is a flow diagram of how a gateway provides at least a minimum of two different levels of QoS to the home network devices, but the number of QoS levels can be substantially greater than the minimum of two (e.g., dozens or even hundreds)

Referring now to FIG. 4, a flow diagram illustrates of how the gateway 304 provides different levels of QoS to a home network device in the Home Network 308. The starting step 401 initiates the process, and in step 402, the port numbers of the gateway 304 are divided into at least first and second ranges as shown in FIG. 2. In step 403, the classified traffic from CMTS 303 is identified as being suitable for either a higher level of QoS or a lower level of QoS, which can be further divided into third, fourth etc. and/or subranges, depending on implementation. In step 404, a determination is made whether a particular device needs a higher level of QoS. In step 405, if the traffic to the device is suitable for a higher level of Qos, then the device is assigned to the first range of port numbers, and in step 406, the device is provided with a higher level of QoS. If in step 404, a determination is made that the traffic to the device is not suitable for a higher level of QoS, then in step 409, the device is assigned to the second range of port numbers, and in step 410, the device is provided with a lower level of QoS. Periodically, in step 407, a determination is made whether device needs a higher level of QoS. If the device continues to need a higher level of QoS, then it continues to be assigned to the first range of port numbers. If it is determined that the device no longer needs a higher level of QoS, then a determination is made in step 408 whether the device should be switched to a lower level of QoS, and if so, it is assigned to a port number in the second range of port numbers. The process continues until the end step 411.

Referring again to FIG. 2, it can be appreciated that the improved NAT process 200 allocates ports from 0-16K for IP addresses mapped into High Priority or a higher level of QoS. All other IP addresses are mapped into the remaining 16K-64K of port spaces. Exposing the port space 0-16K for Classification allows tacit knowledge of home network 308 to be shared with the CMT 303. Other traffic classification in the home could be used to map traffic to the reserved TCP/UDP port range. Multiple TCP/UDP port ranges could be defined in the NAT wan_ip to enable multiple different QoS levels.

Figure 5:
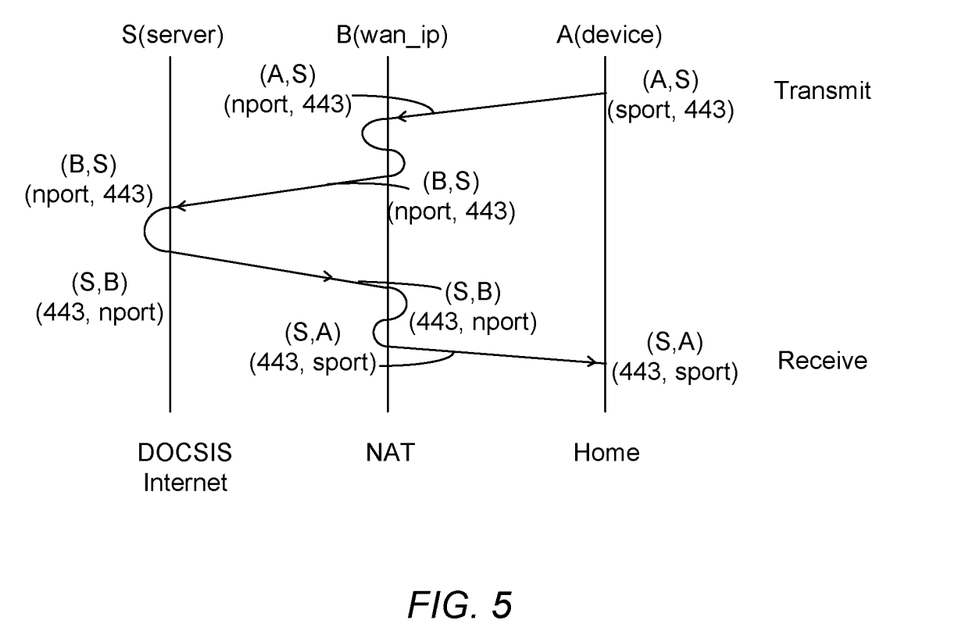
FIG. 5 is a diagram of how the NAT process interacts with a server, a gateway, and a home network device, and it illustrates how a minimum level of at least two levels of QoS to the home network device can be provided.

Referring now to FIG. 5, there is a diagram that illustrates how the improved NAT process 200 interacts with the CMTS 303, the gateway 304, and the home network device A which is part of the home network 308 to provide higher levels of QoS to the home network devices. In the specific example illustrated in FIG. 5, the following actions take place:

device A talks to {S,443} port of the gateway 304 using {A,sport} port of device A.

The traffic from device A is translated using the improved NAT process 200 at gateway 304 or B (wan_ip) from {A,sport} to {B,nport}.

The traffic is then received and responded to by CMTS 303 or S (server).

CMTS 303 or S (server) transmits traffic downstream to {B,nport} of the gateway 304 or B (wan_ip).

The gateway 304 or B (wan_ip) deNATs traffic and sends it from {S,443} to {A,sport}.

If choice of {nport} is limited to a range as explained above, then it is possible to expose this limit to the QoS engine 309 of CMTS 303.

Using a DS Classifier can map traffic using DPORT range to a specific priority or DS service flow.

DS Classifier can ignore IP, but it would be better to dynamically add wan_ip (B) as DS DSTIP.

Selection of home classifiers (IP only, service type, DSCP, other) can be used to select NPORT range to use, which may be an extension of existing Wi-Fi.

A major advantage of the network 300 having the improved NAT process 200 is the ability to identify devices or traffic flows from devices within the home network 308 that need special QoS treatment, such as low-latency, or high bandwidth, and be able to ensure that the local broadband gateway, in combination with the BNG/CMTS 303 can deliver this without requiring significant non-stop QoS signaling across the broadband network.

Computer System Architecture

Figure 6:
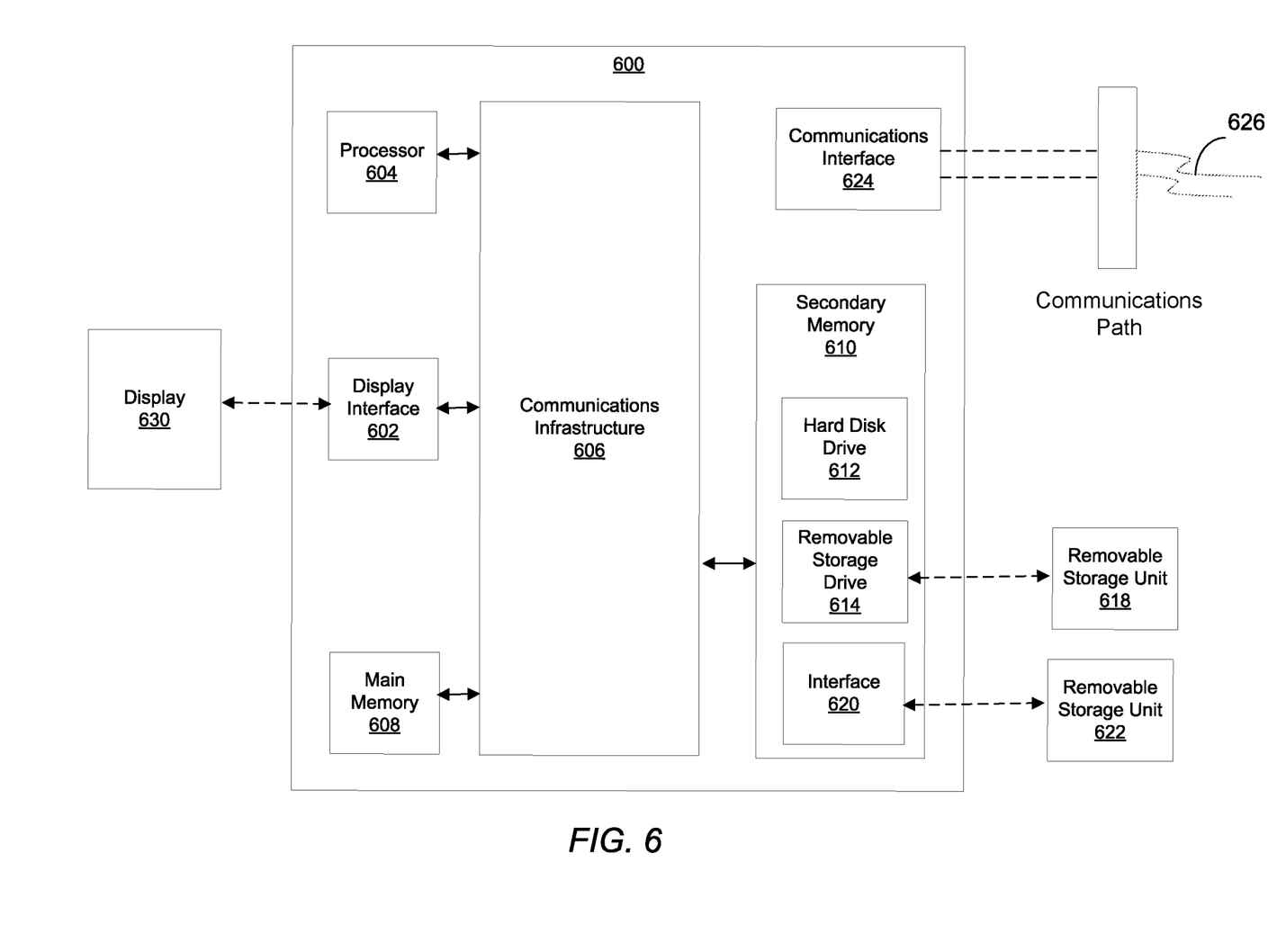
FIG. 6 illustrates a representative computer system 600 in which embodiments of the present disclosure, or portions thereof, may be implemented as computer-readable code.

FIG. 6 illustrates a representative computer system 600 in which embodiments of the present disclosure, or portions thereof, may be implemented as computer-readable code. For example, the gateway 304 and the CMTS 303 of FIG. 3 may be implemented in whole or in part by a computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods and steps of the present disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this representative computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 524. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 2-6, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above. Techniques consistent with the present disclosure provide, among other features, systems and methods for a network having NAT capabilities which improves the QoS low latency prioritization. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for a Network Address Translation ("NAT") gateway to provide different levels of Quality of Service ("QoS") to devices on a Local Area Network ("LAN"), comprising:

dividing ports on the gateway into a number of ranges N, wherein N is a minimum of two, such that there is at least a first range of port numbers and a second range of port numbers, wherein the gateway comprises a server for communicating with the LAN, a cable modem ("CM") Internet Protocol ("IP") address, a Wide Area Network ("WAN") address, and a NAT process, wherein the first range of port numbers and the second range of port numbers are associated with a WAN_IP address;

assigning classified traffic for a first device of the devices identified as suitable for a higher level of QoS to the first range of port numbers;

assigning classified traffic for a second device of the devices identified as suitable for a lower level of QoS to the second range of port numbers; and providing the first device and the second device on the LAN with a level of QoS depending upon the port numbers assigned to classified traffic for the first device and the second device, respectively.

2. A method according to claim 1, wherein the ports on the gateway are divided into the number of ranges N, wherein N is substantially greater than two, and the number of ranges N of port numbers provide additional levels of QoS.

3. A method according to claim 1, wherein the higher level of QoS is a function of low-latency.

4. A method according to claim 1, wherein the higher level of QoS is a function of greater bandwidth.

5. A method according to claim 1, wherein the assignment of traffic to ports includes specific Differentiated Services Code Point ("DSCP") markings found in packets received at the NAT gateway.

6. A method according to claim 1, wherein the ports are Transmission Control Protocol ("TCP") ports.

7. A method according to claim 1, wherein the ports are User Datagram Protocol ("UDP") ports.

8. A Network Address Translation ("NAT") enabled gateway to provide different levels of Quality of Service ("QoS") to devices on a Local Area Network ("LAN"), comprising:

a server of the gateway for communicating with the LAN;

a cable modem ("CM") address of the gateway for enabling the gateway to be addressed by the server and the LAN;

a Wide Area Network ("WAN") address of the gateway;

a NAT process of the gateway;

a plurality of ports on the gateway for enabling the gateway to receive and transmit data to and from the server and the LAN;

a processor for dividing the plurality of ports on the gateway into a number of ranges N, wherein N is a minimum of two, such that there is at least a first range of port numbers and a second range of port numbers, wherein the first range of port numbers and the second range of port numbers are associated with a WAN_IP address;

assigning classified traffic for a first device of the devices identified as suitable for a higher level of QoS to the first range of port numbers;

assigning classified traffic for a second device of the devices identified as suitable for a lower level of QoS to the second range of port numbers; and providing the first device and the second device on the LAN with a level of QoS depending upon the port numbers assigned to classified traffic for the first device and the second device, respectively to which they are assigned.

9. A NAT enabled gateway device according to claim 8, wherein the processor divides the ports on the gateway into the number of ranges N, wherein N is substantially greater than two, and the number of ranges N of port numbers provide additional levels of QoS.

10. A NAT enabled gateway device according to claim 8, which further includes a DHCP server.

11. A NAT enabled gateway device according to claim 8, wherein the Wide Area Network ("WAN") IP address complies with Transmission Control Protocol ("TCP").

12. A NAT enabled gateway device according to claim 8, wherein ports from 0-16K are allocated by the NAT process for Internet Protocol ("IP") addresses of devices mapped into a high priority QoS.

13. A NAT enabled gateway device according to claim 12, which is connected to the Internet via a Cable Modem Termination System ("CMTS").

14. A NAT enabled gateway device according to claim 13, which is connected to the Internet via a Commercial Grade Network Address Translation ("CGNAT") System.

15. A NAT enabled gateway device according to claim 13, wherein the gateway is a Broadband Network Gateway ("BNG").

16. A NAT enabled gateway device according to claim 8, wherein the ports on the gateway are divided into the number of ranges N, wherein N is substantially greater than two, and the number of ranges N of port numbers provide additional levels of QoS.

17. A NAT enabled gateway device according to claim 8, wherein the higher level of QoS is a function of low-latency or greater bandwidth.

18. A NAT enabled gateway device according to claim 8, wherein the assignment of traffic to ports includes specific Differentiated Services Code Point ("DSCP") markings found in packets received at the NAT gateway.

19. A NAT enabled gateway device according to claim 8, wherein the ports are Transmission Control Protocol ("TCP") ports.

20. A NAT enabled gateway device according to claim 8, wherein the ports are User Datagram Protocol ("UDP") ports.

* * * * *